United States Patent [19]

Peter

[11] Patent Number: 4,703,668

[45] Date of Patent: Nov. 3, 1987

[54] WRIST MECHANISM FOR A ROBOT ARM

[75] Inventor: Dirk A. Peter, Toledo, Ohio

[73] Assignee: Champion Spark Plug Company, Toledo, Ohio

[21] Appl. No.: 779,899

[22] Filed: Sep. 25, 1985

[51] Int. Cl.[4] .............................................. B25J 17/02
[52] U.S. Cl. .............................. 74/479; 74/417/665 C; 901/26; 901/29
[58] Field of Search .................. 901/26, 29; 74/665 C, 74/417, 479, 423; 414/735; 138/114

[56] References Cited

U.S. PATENT DOCUMENTS

| | | | |
|---|---|---|---|
| 2,101,631 | 12/1937 | Sarff | 74/417 |
| 3,375,727 | 4/1968 | Nasvytis et al. | 74/417 |
| 3,871,248 | 3/1975 | Barish | 74/665 P |
| 3,922,930 | 12/1975 | Fletcher et al. | 74/665 B |
| 4,030,617 | 6/1977 | Richter | 214/1 CM |
| 4,068,536 | 1/1978 | Stackhouse | 74/417 |
| 4,151,390 | 4/1979 | Bisiach | 219/124.10 |
| 4,218,166 | 8/1980 | Abu-Akeel et al. | 901/21 X |
| 4,250,927 | 2/1981 | Newburg | 138/114 X |
| 4,306,513 | 12/1981 | Legrand | 74/665 C X |
| 4,353,677 | 10/1982 | Susnjara et al. | 414/735 |
| 4,354,657 | 10/1982 | Karlberg | 138/114 X |
| 4,356,554 | 10/1982 | Susnjara et al. | 364/513 |
| 4,365,928 | 12/1982 | Baily | 414/735 |
| 4,402,234 | 9/1983 | Malarz et al. | 74/417 |
| 4,456,058 | 6/1984 | Powell | 138/114 X |
| 4,499,784 | 2/1985 | Shum | 74/479 |
| 4,499,790 | 2/1985 | Helms | 901/26 X |
| 4,574,655 | 3/1986 | Kimura et al. | 901/26 X |
| 4,594,918 | 6/1986 | Kimura et al. | 901/26 X |

FOREIGN PATENT DOCUMENTS

| | | | |
|---|---|---|---|
| 130539 | 1/1985 | European Pat. Off. | 901/26 |
| 629719 | 5/1936 | Fed. Rep. of Germany | 74/417 |
| 2147877 | 5/1985 | United Kingdom . | |
| 624788 | 8/1978 | U.S.S.R. | 901/26 |
| 688328 | 9/1979 | U.S.S.R. | 901/26 |
| 704777 | 12/1979 | U.S.S.R. | 901/29 |
| 770780 | 10/1980 | U.S.S.R. | 901/26 |

Primary Examiner—Robert J. Spar
Assistant Examiner—P. McCoy Smith
Attorney, Agent, or Firm—Oliver E. Todd, Jr.

[57] ABSTRACT

An improved wrist mechanism for a robot arm is disclosed. A first drive mechanism is provided which includes a hollow upper knuckle portion adapted for rotation about a first axis. The upper knuckle portion terminates in an angled end. A second drive mechanism is provided which includes a first hollow torque tube journalled in the upper knuckle portion for rotation relative thereto and a lower knuckle portion having an angled end journalled to the upper knuckle portion curved end for rotation about a second axis. The first torque tube and the lower knuckle portion engage each other for rotation together, and the first and second axes of rotation intersect at a first point. A third drive mechanism includes a second hollow torque tube journalled in the first torque tube for rotation relative thereto, an intermediate drive member journalled in the lower knuckle portion curved end, and an output tube journalled in the lower knuckle portion for rotation about a third axis. The output tube carries a tool mounting surface for attaching a tool thereto. The second torque tube, the intermediate drive means, and the output tube engage one another for rotation together, and the second and third axes of rotation intersect each other at a second point. The first and second points of intersection are offset from one another by a predetermined distance to provide a large radius of curvature for actuating or supply lines carried in a hollow internal passageway of the wrist mechanism to the tool mounted thereon.

13 Claims, 2 Drawing Figures

WRIST MECHANISM FOR A ROBOT ARM

BACKGROUND OF THE INVENTION

1. Field Of The Invention

The present invention relates in general to robot machines and in particular to an improved wrist mechanism for a robot arm.

Robot machines are becoming increasingly common in many industries. Such robot machines typically consist of a support unit, a base mounted on the support unit and rotatable about a vertical axis, and a lower arm mounted on the base and pivotable about a horizontal axis. An upper arm is mounted on the upper end of the lower arm and pivotable about a horizontal axis, and a tool supporting unit universally connected to the upper end of the upper arm through a wrist mechanism. In the past, these wrist mechanisms have been complicated and expensive, while providing only marginally satisfactory performance. Furthermore, many of such wrist mechanisms do not provide any internal passageway for carrying actuating lines to the supported tool. As a result, loose pneumatic, hydraulic, or electrical lines are exposed and may tangle or break because of movement of the robot arm. The prior art wrist mechanisms which do provide an internal passageway for the actuating lines often subject them to extreme angles of bending during movement of the robot arm, thereby promoting fatigue and subsequent failure of the lines.

2. Description Of The Prior Art

U.S. Pat. No. 4,402,234 to Malarz et al. discloses a wrist mechanism having three independent rotational axes with a point of mutual intersection. A stationary housing determines one of the axes, while a second axis is defined by a tool support member. The third axis is determined by an intermediate housing between the stationary housing and the tool support member. The three axes intersect at a single point. A plurality of gear trains provide for independent rotation of the components about the three axes so as to permit selective positioning of the tool support member within a substantially hemispherical envelope. The gear trains are arranged so that an unobstructed enclosed passage is maintained between the stationary base and the tool support member for accommodating actuating lines for a tool mounted on the support member. However, the actuating lines may be subjected to unnecessary stresses since they are both twisted and bent about the point at which the three axes intersect.

British patent application No. 2,147,877A to Dahlquist et al. discloses a wrist for an industrial robot having a large orientation capacity and an unobstructed passage for accommodating tool actuating lines. First, second, third, and fourth turnable wrist parts are arranged in series with each other. The first wrist part is rotatable about a first axis. The second wrist part is journalled in the first part and is rotatable about a second axis which intersects the first axis. The third wrist part is journalled in the second part and is rotatable about a third axis which intersects the second axis. Tool attachment means constituting the fourth wrist part are rotatably journalled in the third wrist part about a fourth axis which intersects the third axis.

U.S. Pat. No. 4,068,536 to Stackhouse discloses a manipulator which orients an end effector mounted to one end of a plurality of serially connected drive shafts. The manipulator has two sets of concentric shafts, with individual shafts within each set independently rotatable about an axis common to the set. The common axes of the two sets are obliquely oriented with respect to each other. A third shaft, rotatable about a third axis, is angularly oriented and connected to the most remote set of shafts.

Other similar devices are disclosed in U.S. Pat. Nos. 3,375,727 to Nasvytis et al., 4,353,677 to Susnjara et al., 4,365,928 to Bailey et al., and 4,499,784 to Shum.

SUMMARY OF THE INVENTION

The present invention relates to an improved wrist mechanism for a robot arm. A first drive mechanism is provided which includes a hollow upper knuckle portion adapted for rotation about a first axis. The upper knuckle portion terminates in an angled end. A second drive mechanism is provided which includes a first hollow torque tube journalled in the upper knuckle portion for rotation relative thereto and a lower knuckle portion having an angled end journalled to the upper knuckle portion angled end for rotation about a second axis. The first torque tube and the lower knuckle portion engage each other for rotation together, and the first and second axes of rotation intersect at a first point. A third drive mechanism is provided which includes a second hollow torque tube journalled in the first torque tube for rotation relative thereto, an intermediate drive means journalled in the lower knuckle portion angled end, and an output tube journalled in the lower knuckle portion for rotation about a third axis. The output tube carries a tool mounting surface for attaching a tool thereto. The second torque tube, the intermediate drive means, and the output tube engage one another for rotation together, and the second and third axes of rotation intersect each other at a second point. The first and second points of intersection are offset from one another by a predetermined distance to provide a large radius of curvature for actuating or supply lines carried in a hollow internal passageway of the wrist mechanism to the tool mounted thereon.

It is an object of the present invention to provide an improved wrist mechanism for a robot arm.

It is another object of the present invention to provide such a wrist mechanism with a large internal passageway and a large radius of curvature for carrying actuating lines to a tool mounted thereon.

It is a further object of the present invention to provide such a wrist mechanism which is simple and inexpensive in construction and operation.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENTS

Figure 1:
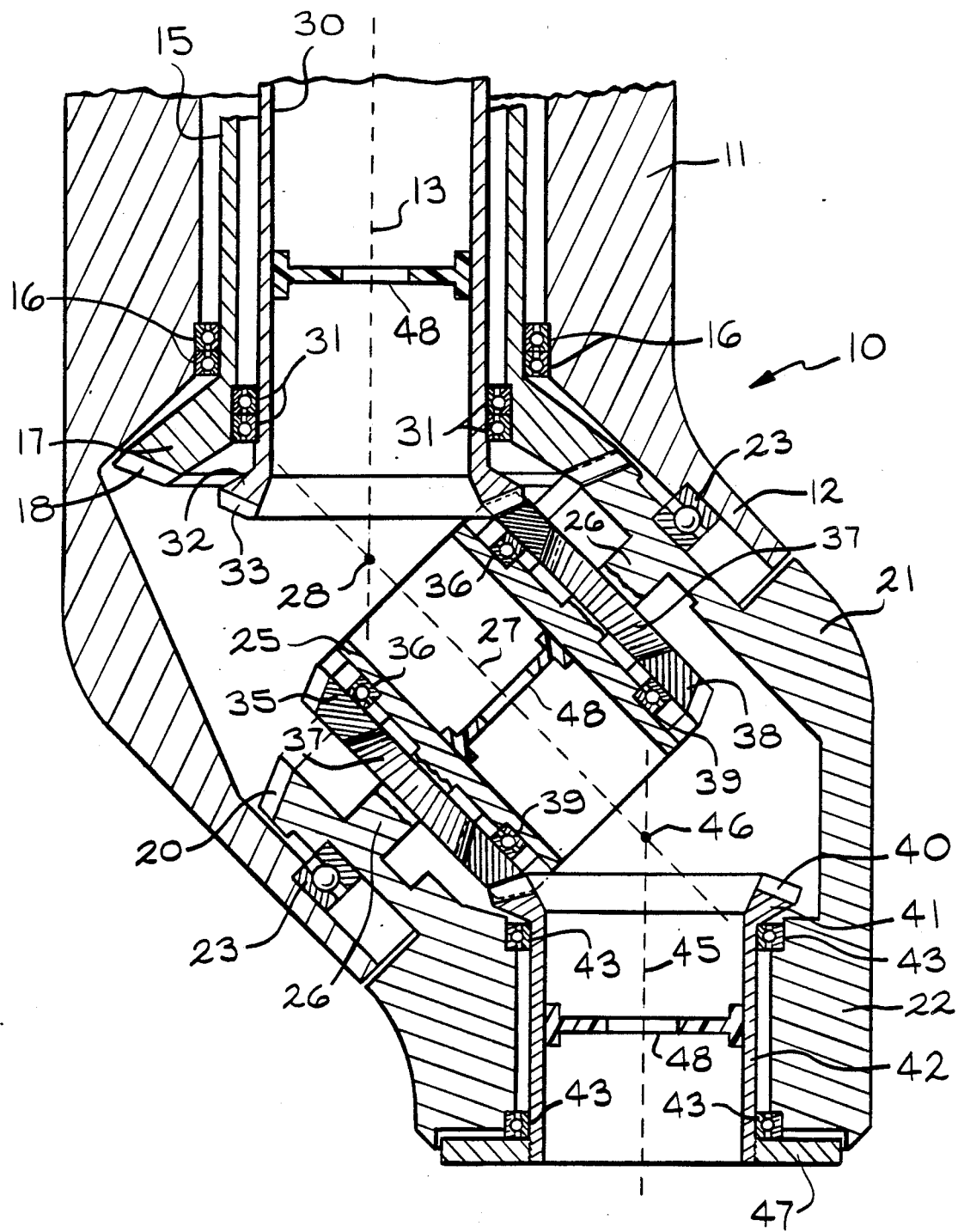
FIG. 1 is a sectional elevational view, partially broken away, of an improved wrist mechanism for a robot arm in accordance with the present invention.

Referring now to the drawings, there is illustrated in FIG. 1 in improved wrist mechanism, indicated generally at 10, for a robot arm (not shown) in accordance with the present invention. The wrist mechanism 10 includes in hollow upper knuckle portion 11 which terminates in an angled end 12. The upper knuckle portion 11 is supported for rotation relative to the robot arm in any convention manner. A first axis of rotation 13 is defined by the upper knuckle portion 11, and a second axis of rotation 27 is defined by the angled end 12 of the upper knuckle portion 11. The second axis of rotation 27 intersects the first axis of rotation 11 at a point 28.

A first hollow torque tube 15 is rotatably supported concentrically within the upper knuckle portion 11 by bearings 16. The first torque tube 15 terminates in a flared end portion 17 upon which a bevel gear 18 is formed. The bevel gear 18 is adapted to cooperate with a corresponding bevel gear 20 formed on an angled end 21 of a hollow lower knuckle portion 22. The angled end 21 of the lower knuckle portion 22 is rotatably secured to the angled end 12 of the upper knuckle portion 11 by a bearing 23 so the lower knuckle portion 22 can rotate about the second axis 27. A hollow mounting bracket 25 is secured to the interior of the angled end 21 of the lower knuckle portion 22 by a pair of inwardly-extending arms 26 formed on the inner surface of the angled end 21 or by other means. The mounting bracket 25 extends coaxial with the second axis of rotation 27.

A second hollow torque tube 30 is rotatably supported concentrically within the first torque tube 15 by means of bearings 31. The second torque tube 30 terminates in a flared end portion 32 upon which a bevel gear 33 is formed. The bevel gear 33 is adapted to cooperate with an intermediate drive means, including a first bevel ring gear 35 rotatably supported concentrically about the mounting bracket 25 by a bearing 36. The first bevel ring gear 35 cooperates with two opposed beveled idler gears 37 which are rotatably supported on the respective arms 26. The idler gears 37 cooperate with the opposed sides of a second bevel ring gear 38, which is also rotatably supported concentrically about the mounting bracket 25 by a bearing 39. The second bevel ring gear 38 cooperates with a bevel gear 40 formed on the flared end portion 41 of a hollow output tube 42. The output tube 42 is rotatably supported concentrically within the lower knuckle portion 22 by bearings 43 and defines a third axis of rotation 45. The third axis of rotation 45 intersects the second axis of rotation 27 at a point 46. A tool mounting surface 47 is secured to the output tube 42 at the end opposite the flared end 41.

In operation, a desired tool is secured to the tool mounting surface, and one or more actuating lines (not shown) therefor are threaded through the large unobstructed passageway defined by the second torque tube 30, the mounting bracket 25, and the output tube 42. If desired, one or more guides 48 can be secured to the interiors of the components which define the hollow passageway to guide the actuating lines therethrough. The guides 48 can consist of any means for releasably grasping or otherwise positioning the actuating lines and spacing such lines away from the interior surfaces of the components. The upper knuckle portion 11, the first torque tube 15, and the second torque tube 30 are then connected in a known manner to respective motor means (not shown) disposed in or connected to the robot machine. The motor means are selectively operated in a known manner to rotate the upper knuckle portion 11, the first torque tube 15, and the second torque tube 30 relative to one another so as to orient the tool mounting surface 47 into a desired position. Rotation of the upper knuckle portion 11 causes the entire illustrated wrist mechanism 10 to rotate about the first axis of rotation 13. Rotation of the first torque tube 15 causes rotation of the lower knuckle portion 22 and the portions of the wrist mechanism 10 supported thereby about the second axis of rotation 27. Rotation of the second torque tube 30 causes rotation of the first bevel ring gear 35, the idler gears 37, the second bevel ring 38, and the output tube 42. Consequently, the output tube 42 and the tool mounting surface 47 are rotated about the third axis of rotation 45. Thus, it will be appreciated that three independent drive mechanisms are provided within the wrist mechanism 10 for orienting the tool mounting surface 47.

The points of intersection 28 and 46 are offset from one another by a predetermined distance. Typically, the acute angle formed between the intersection of the first and second axes of rotation 13 and 27, respectively, is 45°, as is also the acute angle of intersection between the second and third axes of rotation 27 and 45, respectively. Thus, by operation of the motor means, the third axis of rotation 45 can be oriented at any angle from 0° (as illustrated in FIG. 1) to 90° with respect to the first axis of rotation 13. Regardless of what angle the third axis of rotation 45 is oriented relative to the first axis of rotation 13, however, the radius of curvature of the arc defined by that angle will be relatively large because the first and second points of intersection 28 and 46, respectively, are offset as described above. As a result, the actuating lines carried through the wrist mechanism 10 will not be subjected to extreme bending angles which might cause fatigue or failure. To use the illustrative angles of inclination discussed above, the actuating lines are always subjected to two 45° bends offset from one another by a predetermined distance, rather than a single bend which may be a harsh 90° bend. Of course, other angles of inclination can be utilized for different applications of the robot machine. The distance of the offset between the first and second points of intersection 28 and 46, respectively, can also be varied to accommodate actuating lines having varying size, strength, resistance to bending, etc. and also upon the size of the space in which the robot arm must operate.

Figure 2:
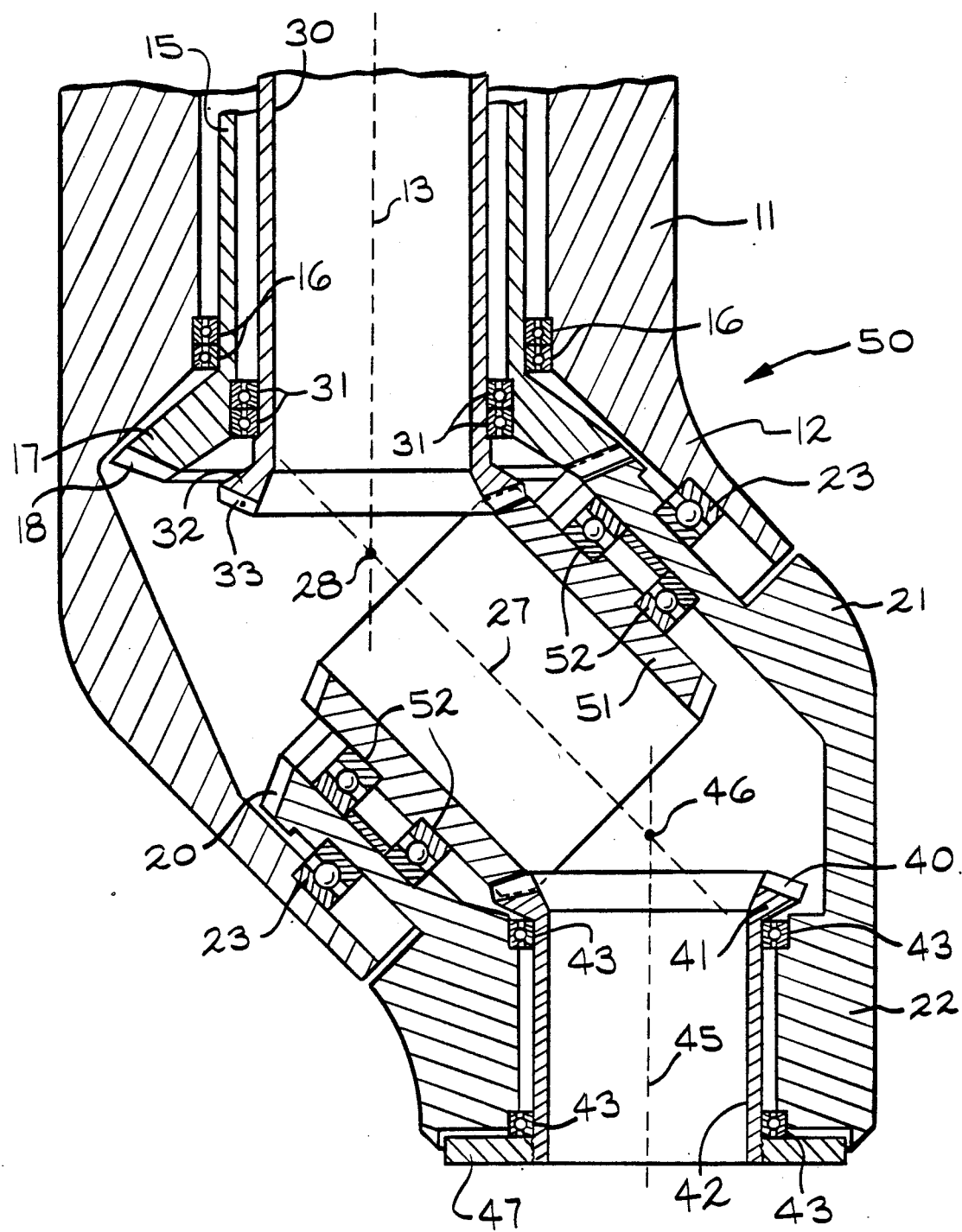
FIG. 2 is a sectional elevational view, similar to FIG. 1, of an alternate embodiment of the present invention.

Referring now to FIG. 2, an alternate wrist mechanism 50 of the present invention is illustrated. For the purpose of simplification, like reference numerals are utilized in FIG. 2 to identify those portions of the alternate wrist mechanism 50 which are identical in structure and operation to the wrist mechanism 10 discussed above. Additionally, the guides 48 have been omitted for simplicity. As illustrated in FIG. 2, the intermediate drive means of the third drive mechanism, consisting of the mounting bracket 25, first and second bevel ring gears 35 and 37, and the idler gears 36, has been replaced by a tubular bevel gear 51. The tubular bevel gear 51 is rotatably journalled concentrically within the angled end 21 of the lower knuckle portion 22 by bearings 52. The tubular bevel gear 51 cooperates with the bevel gear 33 formed on the second torque tube 30 and with the bevel gear 40 formed on the output tube 42 such that rotation of the second torque tube 30 causes corresponding rotation of the tubular bevel gear 51 and the output tube 42. The alternate wrist mechanism 50 is advantageous because it is simpler and less expensive in design, permits a larger internal cavity in the tubular bevel gear 51, and reduces the effects of gear backlash by the elimination of two gear meshes.

The wrist mechanism 10 is useful with various robot mounted tools. For example, the passageway through the wrist mechanism may carry paint and atomization air supply lines, control lines for a spray gun mounted on the wrist mechanism, or electric or gas supply lines for a welding tool mounted on the wrist mechanism. Pneumatic, hydraulic, or electric lines may extend through the passage for operating other types of tools.

In accordance with the provisions of the patent statutes, the principle and mode of operation of the present invention have been explained and illustrated in its preferred embodiments. However, it must be understood that the present invention can be practiced otherwise than as specifically explained and illustrated without departing from its spirit or scope.

What is claimed is:

1. A wrist mechanism for a robot machine comprising:
   a hollow upper knuckle having a first end adapted for rotation about a first axis, said upper knuckle having a second end oriented at an angle relative to said first end, said second end extending along a second axis which intersects said first axis at a first point of intersection;
   a hollow lower knuckle having a first end journalled to said upper knuckle second end for permitting rotation of said lower knuckle about said second axis, said lower knuckle having a second end oriented at an angle relative to said lower knuckle first end defining a third axis which intersects said second axis at a second point of intersection offset from said first point of intersection by a predetermined distance;
   means for mounting a tool on said lower knuckle second end, said upper knuckle, said lower knuckle, and said tool mounting means defining an open passageway extending through said wrist mechanism along said first, second, and third axes;
   first drive means for rotatably positioning said lower knuckle about said second axis; and
   second drive means for rotatably positioning said tool mounting means about said third axis, said second drive means including a first axis bevel gear means disposed for rotation about said first axis, a third axis bevel gear means disposed for rotation about said third axis, and an intermediate gear means for connecting said first and third axis bevel gear means, said intermediate gear means including a first bevel ring gear engaged with said first axis bevel gear means, a second bevel ring gear engaged with said third axis bevel gear means, and an idler gear engaged with said first and second bevel ring gears.

2. The wrist mechanism for a robot machine defined in claim 1 wherein said upper knuckle is shaped with said second axis angled 45° from said first axis and wherein said lower knuckle is shaped with said third axis angled 45° from said second axis, whereby said first and third axes extend parallel to one another at one position of said lower knuckle about said second axis and extend perpendicular to one another at another position of said lower knuckle about said second axis.

3. The wrist mechanism for a robot machine defined in claim 1 wherein said tool mounting means includes a hollow tool mount journalled to said lower knuckle second end for rotation relative thereto about said third axis, said second drive means being adapted for rotatably positioning said tool mount about said third axis.

4. The wrist mechanism for a robot machine defined in claim 3 wherein said lower knuckle first end includes a first bevel gear concentric with said second axis, and wherein said first drive means includes a first hollow torque tube journalled in said upper knuckle for rotation relative thereto about said first axis, said first torque tube terminating at a second bevel gear which engages said first bevel gear to rotate said lower knuckle about said second axis when said first torque tube is rotated about said first axis.

5. The wrist mechanism for a robot machine defined in claim 4 wherein said tool mount has an outer tool mounting end and an inner end terminating in said third axis bevel gear means, and wherein said second drive axis means includes a second hollow torque tube jorunalled in said first torque tube for rotation relative thereto about said first axis, said second torque tube terminating in said first axis bevel gear means, said intermediate gear means interconnecting said first and third axis bevel gear means for rotation together.

6. The wrist mechanism for a robot machine defined in claim 5 wherein said intermediate gear means includes a mounting bracket secured to the interior of said lower knuckle first end, said intermediate gear means being rotatably supported by said mounting bracket, and wherein the passageway through said wrist mechanism extends through said mounting bracket.

7. The wrist mechanism for a robot machine defined in claim 6 wherein two idler gears are supported on diametrically opposed sides of said mounting bracket to rotate about an axis perpendicular to said second axis, each of said two idler gears engaging both of said first and second bevel ring gears.

8. The wrist mechanism for a robot machine defined in claim 7 wherein said upper knuckle is shaped with said second axis angled 45° from said first axis and wherein said lower knuckle is shaped with said third axis angled 45° from said second axis whereby said first and third axes extend parallel to one another at one position of said lower knuckle about said second axis and extend perpendicular to one another at another position of said lower knuckle about said second axis.

9. The wrist mechanism for a robot machine defined in claim 6 and further including guides secured in the passageway to the interiors of said second torque tube, said mounting bracket and said tool mount.

10. A wrist mechanism for a robot machine comprising:
    a hollow upper knuckle adapted for rotation about a first axis, said upper knuckle having an angled end extending along a second axis which intersects said first axis at a first point of intersection;
    a hollow lower knuckle having an angled end journalled to said angled upper knuckle end for rotation about said second axis, said lower knuckle having a second end defining a third axis which intersects said second axis at a second point of intersection offset from said first point of intersection by a predetermined distance;
    means for mounting a tool on said second lower knuckle end, said upper knuckle, said lower knuckle, and said tool mounting means defining an open passageway extending through said wrist mechanism along said first, second, and third axes;
    first drive means for rotatably positioning said lower knuckle about said second axis; and
    second drive means for rotatably positioning said tool mounting means about said third axis, said second drive means including a hollow torque tube journalled in said upper knuckle for rotation about said first axis and an intermediate drive gear assembly interconnecting said torque tube and said tool mounting means for rotation together, said intermediate drive gear assembly including a mounting bracket secured to the interior of said angled lower knuckle end, at least one idler gear rotatably supported on said mounting bracket, a first bevel ring gear supported on said mounting bracket for rotation about said second axis and connected to said torque tube and said idler gear for rotation therewith, and a second bevel ring gear supported on said mounting brcket for rotation about said second axis and connected between said idler gear and said and tool mounting means for rotation therewith.

11. The wrist mechanism for a robot machine defined in claim 10 wherein two idler gears are supported on diametrically opposed sides of said mounting bracket to rotate about an axis perpendicular to said second axis, each of said two idler gears engaging both of said first and second bevel ring gears.

12. The wrist mechanism for a robot machine defined in claim 11 wherein said upper knuckle is shaped with said seond axis angled 45° from said first axis and wherein said lower knuckle is shaped with said third axis angled 45° from said second axis, whereby said first and third axes extend parallel to one another at one position of said lower knuckle about said second axis and extend perpendicular to one another at another position of said lower knuckle about said second axis.

13. The wrist mechanism for a robot machine defined in claim 12 further including guides secured in the passageway to the interiors of said torque tube, said mounting bracket, and said tool mounting means.

* * * * *